Oct. 20, 1931.  I. M. LADDON  1,828,192
AIRCRAFT
Filed Sept. 13, 1929   2 Sheets-Sheet 1
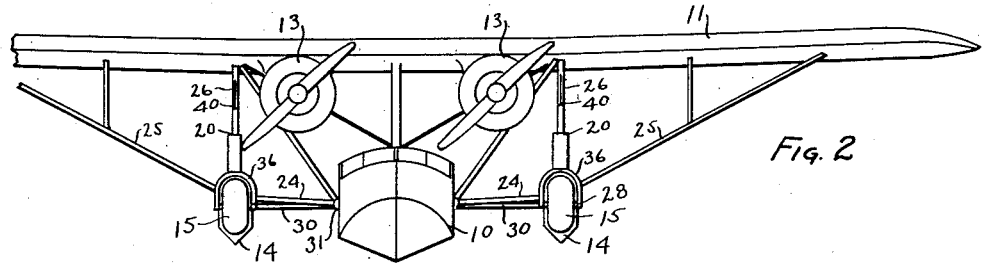
Fig. 2
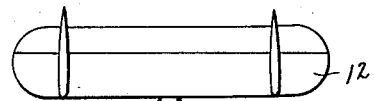
Fig. 1
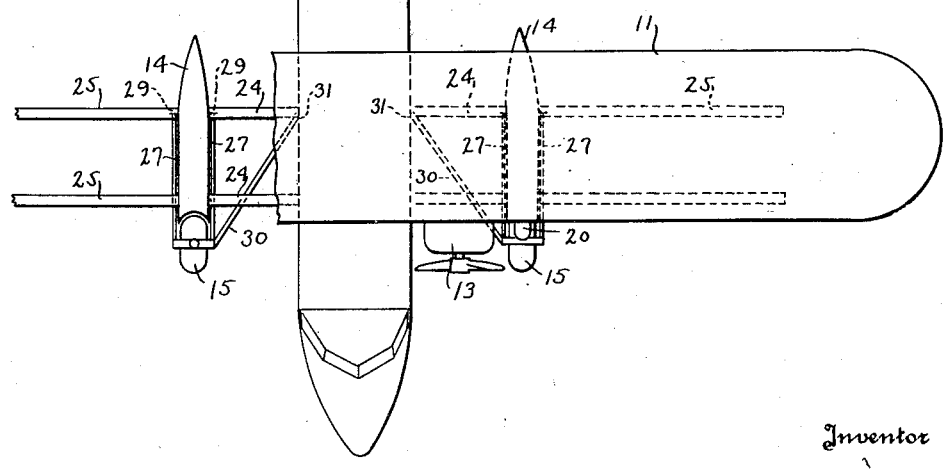
Inventor
I. M. Laddon
By Maréchal and Noe
Attorneys Oct. 20, 1931.   I. M. LADDON   1,828,192
AIRCRAFT
Filed Sept. 13, 1929   2 Sheets-Sheet 2
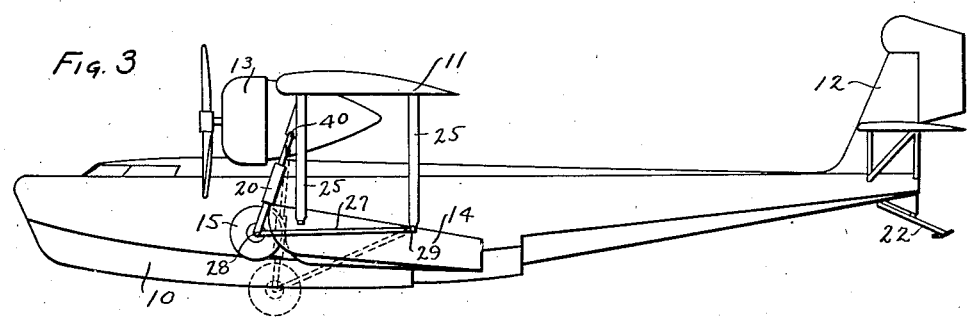
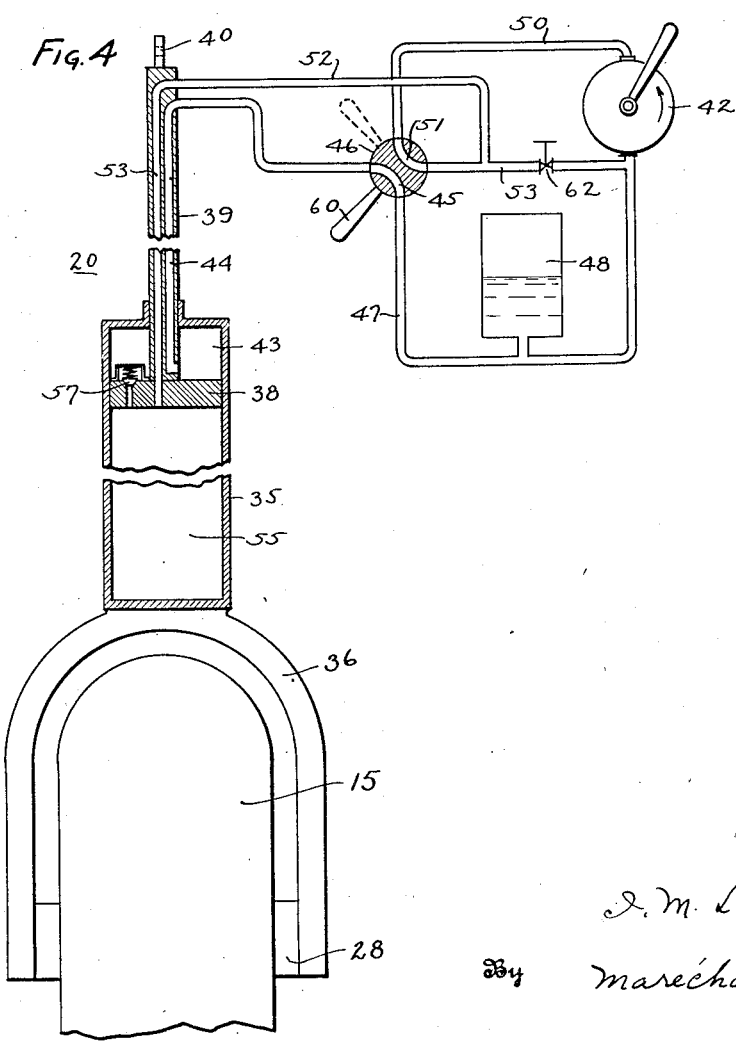
Inventor
I. M. Laddon
By Maréchal and Noe
Attorneys Patented Oct. 20, 1931

1,828,192

UNITED STATES PATENT OFFICE

ISAAC M. LADDON, OF BUFFALO, NEW YORK, ASSIGNOR TO CONSOLIDATED AIRCRAFT CORPORATION, OF BUFFALO, NEW YORK, A CORPORATION OF DELAWARE

AIRCRAFT

Application filed September 13, 1929. Serial No. 392,336.

This invention relates to aircraft, and more particularly to aircraft of the amphibian type.

One of the principal objects of the invention is the provision of ground landing means for aircraft which offers a minimum of resistance to the movements of the aircraft in the water or in the air, and which is rigidly and durably constructed to provide suitable shock absorbing means for landing on the ground.

Another object of the invention is the provision of ground landing means for amphibian aircraft which assist in providing buoyancy and stability for the aircraft when in the water.

In the drawings, which disclose a preferred form of the invention, and in which like characters of reference designate like parts in the several views thereof,—

Fig. 1 is a plan view of an aircraft embodying the present invention;

Fig. 2 is a front elevational view of Fig. 1;

Fig. 3 is a side elevational view thereof; and

Fig. 4 is a diagrammatic showing of a retracting mechanism.

In the illustrated form of the invention an aircraft is shown of the amphibian type which is adapted to alight upon water or upon the land. The airplane comprises a hull or main flotation body 10 having accommodations for the pilot and load, the customary main sustaining surfaces 11, control surfaces 12, and engines 13; auxiliary flotation bodies or side floats 14 and landing wheels 15 are also provided and are suitably braced to the other parts of the structure to provide a strong and rigid construction.

The hull or main flotation body 10 is preferably of streamlined form and is adapted to support the aircraft when it is in the water. The auxiliary or side floats 14 provide additional buoyancy and lateral stability for the craft when it is afloat and, as shown, are positioned one on either side of the hull 10. The ground landing wheels 15 are provided with movable supporting structures so that they may be extended to a position below the hull when the aircraft is to land upon the ground, and may be raised to a retracted position when in flight or for landing upon the water. The wheels are preferably positioned somewhat in front of a transverse plane extending through the center of gravity of the aircraft so that they will assume all or the major portion of the forces when landing on the ground. A rear landing member, such as the tail skid 22, provides additional support for the airplane when on the ground. When the wheels are in retracted position, as in flying or afloat, they are adapted to lie in close relationship to the side floats. Each wheel, or set of wheels, is shown in front of and adjacent a side float; the wheel forming the streamline nose for the float, and the float in turn providing a streamline fairing for its wheel. Preferably a wheel of large cross section and having high width height ratio is used, and is associated with a float of commensurate section. The front end of the float may be cupped or hollowed out, as shown, to conform to the curvature of the wheel so that the float may be closely associated therewith and will extend rearwardly in streamline continuation of the wheel. By positioning the wheels in streamline relationship with the float 14 it is possible to permit the wheels to be partly submerged when the aircraft is in the water without encountering any frictional drag from the submerged wheels. The wheels in this position provide additional buoyancy which materially contributes to the lateral stability of the airplane when it is in the water. Being in streamline relationship with the side floats 14 the wheels are also without frictional drag when the airplane is in the air. This relationship of wheel and float also results in simplification and reduction of weight in the retracting mechanism for the wheels as the distance the wheels must be moved from a suitable landing position below the main flotation body or hull to the retracted position in front of the floats is considerably less than that required to retract the wheels above the normal water line of the airplane as would be necessary if the wheels were not positioned to be free of frictional drag and would thereby have to be lifted above the water line.

The side floats 14 are shown positioned with respect to the main flotation body 10 by means of horizontal brace members 24 which extend therebetween, diagonal brace members 25 which extend from the side floats to the main sustaining surface, and vertical brace members 26 which also extend from the side floats to the main sustaining surface. The wheels 15 are attached to the airplane structure by means of parallel members 27 which are pivotally secured at 29 to the rear portion of the side floats 14 and which extend forwardly and are attached to the axles 28 of the wheels 15. Diagonal brace members 30 extend from the wheel axles to the main flotation body 10 and are pivoted at 31 in alignment with the pivot points 29 of the members 27. A strong triangular bracing is thereby provided for each of the wheels 15 which are movable substantially vertically about an axis which lies transversely with respect to the airplane body and which coincides with one side of each triangular brace. Vertical movement of each wheel 15 is provided by a retracting mechanism which enables the pilot to move the wheels from a position in substantial alignment with the side floats 14 to an extended position for landing. The retracting mechanism comprises telescopic struts 20 having actuating mechanisms whose controls are accessible to the pilot.

Each wheel is provided with an inflated tire or tires preferably a tire of the low air pressure ultra-balloon type which has an extremely large cross section with respect to its height and is adapted to carry substantial loads at very low pressure due to the large area of contact of the tire with the ground. When the airplane is moving through the water with the wheels retracted as in preparation for take off the rounded surfaces of the wheels, which in effect are the front or entering edges of the floats, enables the floats to be drawn through the water with a minimum drag.

Although other suitable types of retracting mechanism may be used to lower the wheel for ground landing, a hydraulic type is illustrated which, in addition to its function of raising and lowering the wheels, is also adapted to absorb extreme shocks such as may be encountered in making a rough landing. The retracting mechanism for each wheel comprises a cylinder 35 which is attached to a supporting yoke 36 within which is attached the axle 28 of a wheel 15. A piston 38 is provided within the cylinder 35 which contains suitable liquid such as oil, and is attached to a piston rod 39; the end of which is pivotally mounted at 40 to the vertical strut 26 thereby providing a telescoping support for the wheel. When it is desired to lower the wheel, oil pressure is supplied to the cylinder 35 by means of a pump 42, which is within convenient reach of the pilot, and, upon actuation of which oil is drawn from the area 43 within the cylinder 35 and above the piston 38, through a pipe 44, a valve passage 45 which is diagrammatically shown within a valve 46, and through a pipe 47 which is attached to the pump 42. An expansion reservoir 48 is provided in the pipe 47. Actuation of the pump forces oil through the pipe 50, the valve passage 51, and the pipe 52 which communicates with a passage 53 in the piston 39 and opens into the area 55 below the piston 38 of the cylinder 35 to force the cylinder and wheel downwardly. When the pilot desires to land the ship on the ground he positions the control valve 46 as shown in the drawing and actuates the pump 42 whereupon the oil flows into the area 55 and causes the cylinder to be forced outward to bring the wheel into the dotted line position in Fig. 3. A spring pressed valve 57 is provided in the piston 38 to permit passage of oil from the areas 55 into the area 43 whenever the pressure within the area 55 exceeds the spring pressure bearing against the valve 57. The spring pressure is usually set to permit the cylinder to sustain a load of substantially one and one-half the times the normal landing load on the wheels consequently if a load exceeding this amount is encountered, such as in making a rough landing, a quantity of oil will be by-passed through the valve with resulting movement of the cylinder and the wheel which effectively absorbs the extreme shocks of a landing. This absorption of the shock is accomplished in a gradual manner and without rebound by a device of this character. The normal shocks of landing are absorbed by the inflated tires of the wheels 15.

When it is desired to retract the wheels the handle 60 of the control valve 46 is moved to the dotted line position and the pump 42 is then actuated to draw oil from the area 55 within the cylinder and force it into the area 43 thereby moving the cylinder and wheels upwardly to the full line position shown in Fig. 3. A valve 62 is provided in the retracting mechanism for rapidly lowering the wheels by gravity. A by-pass pipe 53, within which the valve 62 is located, connects the pipe 52 to the pipe 47 so that upon opening the valve 62 the oil can flow freely from the compartment 43 into compartment 55 thereby permitting the wheels to be lowered by their own weight. The expansion reservoir 48 is provided to compensate for the difference in volume of oil in the cylinder in retracted and extended position. Both wheels 15 may be actuated by a single pump 42 or separate pumps may be provided which may be actuated simultaneously or individually as desired.

The construction, as will now be apparent, is such as to give a structure offering a minimum of drag in the water or air at times when high speed or efficiency in operation is desired. The construction also provides suitable mechanism for landing on the ground and for effectively absorbing the shocks of a ground landing.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a body, a fixed float, a ground engaging wheel, said wheel being arranged in front of said float making a streamlined form therewith, and means for moving said wheel downwardly out of streamlined arrangement with said float for landing on the ground on the wheel.

2. In an aircraft, a main body, a float for said body, a ground engaging wheel, said wheel being arranged in front of the float, both the wheel and the float having a width height ratio of about one-half making a streamlined form, and fluid pressure means for moving said wheel downwardly for landing on the ground on the wheel.

3. In an aircraft, a main body, a float for said body, a ground engaging wheel having an inflated tire whose width height ratio is about one-half, said float and wheel being of substantially equal height and width and arranged one in front of the other to provide a streamlined form, and means for moving said wheel downwardly for landing on the ground on the wheel.

4. In an aircraft, a body, a ground engaging wheel having an inflated tire of large width height ratio, a U-bottom float normally positioned to the rear of said wheel and having a width height ratio substantially equal to that of the wheel thus providing a streamlined fairing therefor, and means for moving said wheel downwardly out of its normal position for landing on the ground.

5. In an aircraft, a body, a ground engaging wheel having an inflated tire of large width height ratio, a float in the rear of said wheel and providing a streamlined fairing therefor, said float having a height and width substantially equal to the height and width of the wheel, and hydraulic retracting and shock absorbing means for moving said wheel out of streamlined position for landing on the ground.

6. In an aircraft, a main body, side floats, ground engaging wheels adapted to be moved downwardly from a position in front of said floats to a lowered position for landing, said wheels in retracted position being positioned adjacent said floats in streamlined relationship thereto, triangular supporting frames for said wheels supported to the rear portion of said floats for pivotal movement, and means for moving said wheels.

7. In an aircraft, a main body, side floats, ground engaging wheels adapted to be moved downwardly from a position in front of said floats to a lowered position for landing, said wheels in retracted position being positioned longitudinally adjacent said floats in streamlined relationship, triangular supporting frames for said wheels supported to the rear portion of said floats for pivotal movement, and hydraulic means for moving said wheels.

8. In an aircraft, floats positioned at opposite sides of the center of gravity of the aircraft, ground engaging wheels adapted to be moved downwardly from a position in front of said floats to a lowered position for landing, supporting frames for said wheels supported at the rear portion of said floats for pivotal movement, and means for moving said wheels.

9. In an aircraft, a main body, side floats, ground engaging wheels adapted to be moved downwardly from a position in front of said floats to a lowered position for landing, triangular supporting frames for said wheels supported at the rear portion of said floats for pivotal movement about a transverse axis coinciding with one side of the triangle, position defining means extending upwardly from the front of said frame, and adjusting means for said position defining means for moving the wheels.

10. In an aircraft, a main flotation body adapted to float upon water, side floats, ground engaging wheels having a buoyant effect in water, means for moving said wheels from a flying position in front of said side floats and above the bottom of the main flotation body to a supporting position below the bottom of said body for landing on the ground, said wheels being positioned to be partly submerged when the aircraft is in the water.

In testimony whereof I hereto affix my signature.

ISAAC M. LADDON.